US008176480B1

(12) United States Patent
Spertus

(10) Patent No.: US 8,176,480 B1
(45) Date of Patent: May 8, 2012

(54) ADAPTIVE INSTRUMENTATION THROUGH DYNAMIC RECOMPILATION

(75) Inventor: Michael P. Spertus, Chicago, IL (US)

(73) Assignee: Symantec Operating Corporation, Mountain View, CA (US)

( * ) Notice: Subject to any disclaimer, the term of this patent is extended or adjusted under 35 U.S.C. 154(b) by 1351 days.

(21) Appl. No.: 11/362,956

(22) Filed: Feb. 27, 2006

(51) Int. Cl.
*G06F 9/45* (2006.01)
(52) U.S. Cl. ......... 717/158; 717/127; 717/130; 717/131
(58) Field of Classification Search ................. None
See application file for complete search history.

(56) References Cited

U.S. PATENT DOCUMENTS

| | | | |
|---|---|---|---|
| 5,455,949 A | 10/1995 | Conder et al. | |
| 6,327,699 B1 | 12/2001 | Larus et al. | |
| 6,651,243 B1 * | 11/2003 | Berry et al. | 717/130 |
| 6,728,955 B1 | 4/2004 | Berry et al. | |
| 6,779,187 B1 | 8/2004 | Hammond | |
| 7,003,765 B1 | 2/2006 | Venkatasubramanian et al. | |
| 7,007,026 B2 | 2/2006 | Wilkinson et al. | |
| 7,093,234 B2 * | 8/2006 | Hibbeler et al. | 717/124 |
| 7,293,260 B1 * | 11/2007 | Dmitriev | 717/130 |
| 7,500,227 B1 * | 3/2009 | Fontana et al. | 717/127 |
| 2003/0041316 A1 * | 2/2003 | Hibbeler et al. | 717/130 |
| 2005/0010930 A1 * | 1/2005 | Vaught | 719/318 |
| 2006/0236310 A1 * | 10/2006 | Domeika et al. | 717/140 |
| 2007/0168998 A1 * | 7/2007 | Mehta et al. | 717/130 |

OTHER PUBLICATIONS

Mikunov, Aleksandr, ".NET Internals, Rewrite MSIL Code on the Fly with the .NET Framework Profiling API", Sep. 2003, Microsoft, MSDN Magazine Sep. 2003. pp. 1-9.*

Keljo, Jonathan, "RE: ICorProfilerInfo::SetfunctionReJIT causes deadlock", Sep. 8, 2004. tech archive (http://www.tech-archive.net/Archive/DotNet/microsoft.public.dotnet.framework.clr/2004-09/0057.html) pp. 1-2.*
Brian Goetz, "Java theory and practice: Dynamic compilation and performance measurement" IBM developerWorks, Dec. 2004, <http://www.ibm.com/developerworks/library/j-jtp12214/> whole document (12 pages).*
"IBM Java Diagnostics Guide 1.4.2 WIN64AMD, JIT Overview" IBM, Nov. 2004, <http://publib.boulder.ibm.com/infocenter/javasdk/v1r4m2/index.jsp?topic=%2Fcom.ibm.java.doc.diagnostic.142j9%2Fhtml%2Fid1218.html> whole document (1 page).*
Mikunov, Aleksander, "Rewrite MSIL Code on the Fly with the .NET Framework Profiling API", MSDN Magazine, 2007, pp. 1-9.
Veritas, "Veritas Indepth for Microsoft .NET", Installation and Administration Guide, Copyright 2005, Mountain View, CA, pp. 1-40.

* cited by examiner

*Primary Examiner* — Tuan Dam
*Assistant Examiner* — Samuel Hayim
(74) *Attorney, Agent, or Firm* — Rory D. Rankin; Meyertons, Hood, Kivlin, Kowert & Goetzel

(57) ABSTRACT

A system and method for instrumenting program instructions. A processing system includes a compiler and a profiler. The profiler is configured to instrument an application by inserting one or more instrumentation instructions in the application. During execution of the application, execution is monitored and a particular condition is detected. Responsive to the condition, a portion of the code which corresponds to the detected condition is identified. A request is conveyed for recompilation of code which corresponds to code. Prior to recompilation of the code, the profiler instruments the portion of code. Execution and monitoring of the execution continue, and instrumentation/recompilation may be repeated. Initially, relatively little of the application code may be instrumented. As execution and monitoring continues, more and more of the application code may be dynamically instrumented during execution.

20 Claims, 7 Drawing Sheets

ADAPTIVE INSTRUMENTATION THROUGH DYNAMIC RECOMPILATION

BACKGROUND OF THE INVENTION

1. Field of the Invention

This invention relates to computer processes and, more particularly, to the instrumentation of computer application code.

2. Description of the Related Art

In order to better understand the operation of software processes, it is common to employ any of a variety of monitoring, profiling, and/or analysis techniques in conjunction with the software processes to be understood. Such monitoring, profiling, and analysis techniques which, for simplicity, may collectively be referred to as "profilers", are available from many vendors or may be custom-made for specific applications. As part of a profiling or monitoring process, application code may be "instrumented" by adding instructions (i.e., code) sometimes referred to as "probes" to an application's original code. These probes may then generate additional data concerning the operation of the application during runtime.

Traditionally, there have been two general approaches to the instrumentation of application code. One approach is static instrumentation, and the other approach is dynamic instrumentation. However, both of these approaches have disadvantages. Static instrumentation generally involves replacing an application's original executables with instrumented executables. However, such an approach can be difficult to manage. One difficulty with managing statically instrumented applications is the user needs to know which executables make up their application, and which executable are instrumented and non-instrumented. Another problem with static instrumentation is that digitally-signed code generally cannot be instrumented. If a digitally signed assembly, library, or other code is instrumented, the process which loads the instrumented code may reject it due to a failed signature verification.

In dynamic instrumentation, application code (e.g., intermediate code) may be instrumented at the time the code is actually loaded for execution. For example, in the Microsoft .NET framework, bytecodes may be instrumented when a method or assembly is loaded for just in time (JIT) compilation. Alternatively, code may be instrumented when a class is loaded in a Sun Microsystems' Java environment. While the dynamic approach may avoid the need for replacing deployed executables on disk, it may also entail significant performance implications due to the overhead involved. Further, it may also be very difficult to support and maintain code while using a dynamic instrumentation approach, because no instrumented files are generated that can be sent to support.

In addition to the above, one of the issues with profiling code concerns the generation of too much data or information regarding the operation of a particular application. As a general matter, those analyzing the operation of various applications may not necessarily be interested in every part of the application. Consequently, various efforts may be undertaken to reduce the amount of superfluous data which is generated. One such technique for reducing the generation of unneeded data involves providing "switches" for probes which allows the probes to either be enabled or disabled. By selectively enabling or disabling probes, more or less probe data may be generated. While such a technique may reduce the production of unwanted data, the instrumentation of the code itself may cause a reduction in performance of the application. For example, while a probe may be disabled, it may generally be necessary to execute instructions in order to determine whether or not the probe is to be enabled or disabled. Therefore, instrumenting the code may in and of itself result in undesirable overhead—irrespective of whether or not probes are enabled or disabled.

Another alternative for reducing the amount of data generated by probes is to simply instrument less of the application code. However, utilizing this approach, various performance characteristics may never be captured during execution and diagnosis of a corresponding problem may be rendered overly difficult.

In view of the above, an effective and efficient method and mechanism for instrumenting application code is desired.

SUMMARY OF THE INVENTION

Systems and methods for managing the instrumentation of program code are contemplated.

A processing system is contemplated which includes a compiler and a profiler. The system is configured to support registration by various components for notification of events, including notification of compilation events from the compiler. The profiler is configured to instrument application code and monitor execution. During execution of an application, a particular event or condition may be detected by the profiler. Responsive to detecting the event or condition, a portion of code which corresponds to the detected condition is identified. The profiler may then convey a request for recompilation of the identified code. Prior to recompilation of the code, the profiler is configured to instrument the code which is to be recompiled. Subsequent to recompilation, execution and monitoring of the code continues. In one embodiment, relatively little of the application code may be instrumented initially. As execution and monitoring continues, more and more of the application code may be dynamically instrumented during execution.

In one embodiment, the system comprises a framework including a just in time compiler. A configuration file may be utilized to configure the profiler upon load of a given application. The configuration file may include an indication as to a select number of methods of the application code which are to be initially instrumented. During execution of the application, a condition, such as a relatively long performance latency, may be detected for a given portion of code or service. In response, the profiler may examiner the application code associated with the detected condition. Methods which are identified as being called by the associated application code may then be identified as requiring instrumentation. The profiler then coveys a recompilation request to the underlying framework and stores an instrumentation indication for the code identified as requiring instrumentation. When a recompilation event corresponding to the code is detected, the profiler instruments the code prior to recompilation.

These and other embodiments will become apparent upon reference to the following description and accompanying figures.

Figure 1:
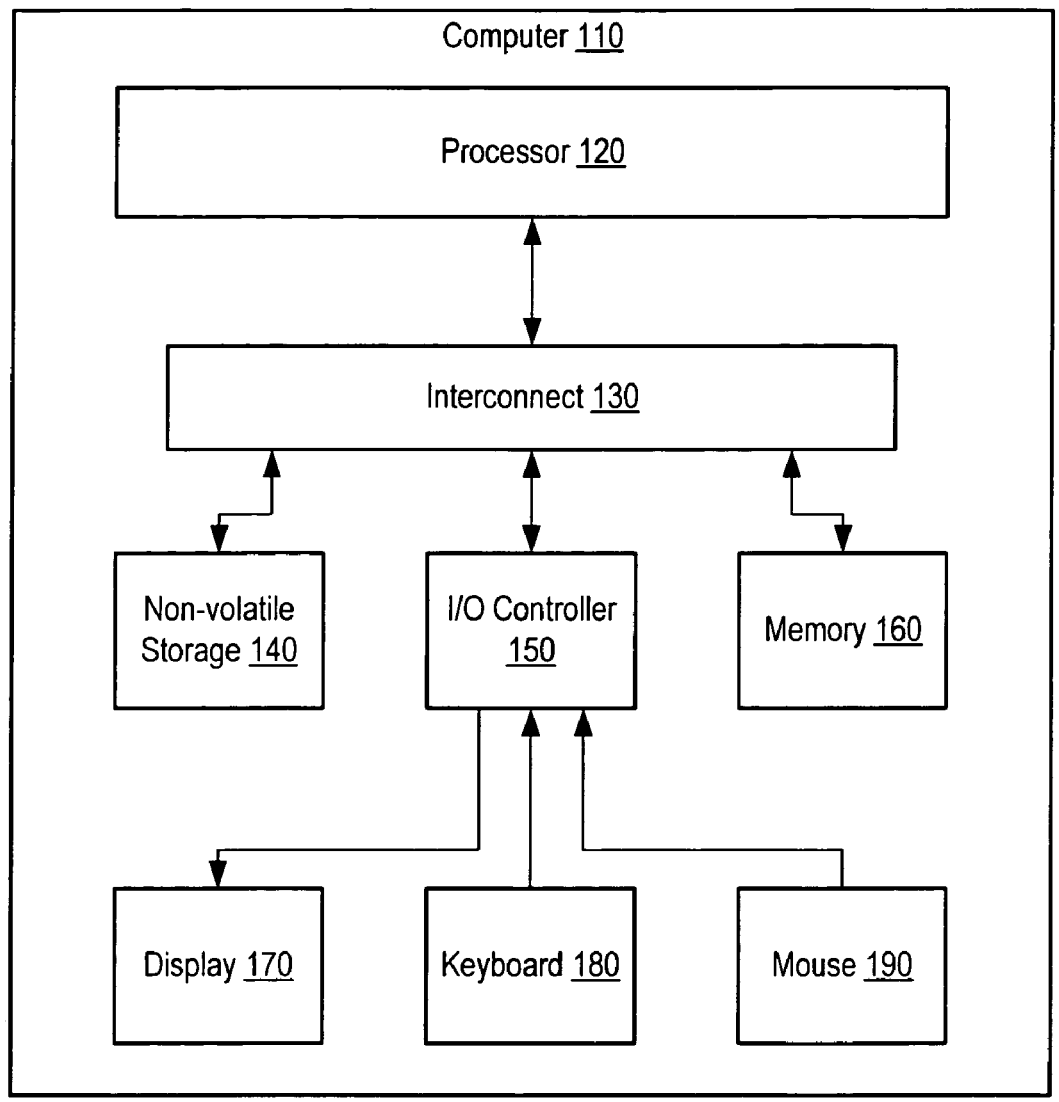
FIG. 1 illustrates one embodiment of a computer including a processor.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein.

FIG. 1 illustrates one embodiment of a computer 110 including a processor 120. Processor 120 is shown coupled through an interconnect 130 to a non-volatile storage 140, an I/O controller 150, and a memory 160. I/O controller 150 may be coupled to a display 170, a keyboard 180, and a mouse 190. A variety of other peripheral devices such as boot devices and network interfaces may be coupled to I/O controller 150 as well as or instead of those described above. In addition, interconnect 130 may couple a variety of other devices to processor 120 depending on the desired functionality of computer 110.

Processor 120 may be configured to execute instructions and to process data according to a particular instruction set architecture (ISA). In one embodiment, processor 120 may be configured to implement an x86 compatible ISA, although in other embodiments it is contemplated that any desired ISA may be employed, such as the SPARC V9 ISA, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.).

In various embodiments, memory 160 may comprise any suitable type of system memory as described above, such as FB-DIMM, DDR/DDR2 SDRAM, or RDRAM®, for example. Memory 160 may include multiple discrete banks of memory. Also, in some embodiments memory 160 may include multiple different types of memory.

In some embodiments, computer 110 may include more than one instance of the devices shown, such as more than one processor 120, for example. In various embodiments, computer 110 may be configured as a rack-mountable server system, a standalone system, or in any other suitable form factor. In some embodiments, computer 110 may be configured as a client system rather than a server system.

In one embodiment, processor 120 may be configured to run operating system software such as Microsoft Windows, IBM AIX or Sun Microsystems Solaris. Operating system software may in turn provide an environment in which processor 120 may execute additional software modules in the form of applications, programs, or processes designed to perform specific functions. Running operating system software or software modules may comprise executing instructions that are stored in memory 160.

Software modules that may be executed by processor 120 may include, in one embodiment, client/server software such as a web server or a web browser. Alternatively, or in addition, processor 120 may execute software modules comprising network management software, office productivity tools, e-mail programs, etc. Many other types of software may be executed such as a virtual machine runtime environment, a database, an application server, and diagnostic, monitoring, profiling, or analysis software. Furthermore, while executing such software, processor 120 may retrieve data from and store data in non-volatile storage 140 or in memory 160. In one embodiment, one or more software processes may perform the function of profiling other software processes during operation, gathering and storing data indicative of the operation of one or more of the other software processes.

Figure 2:
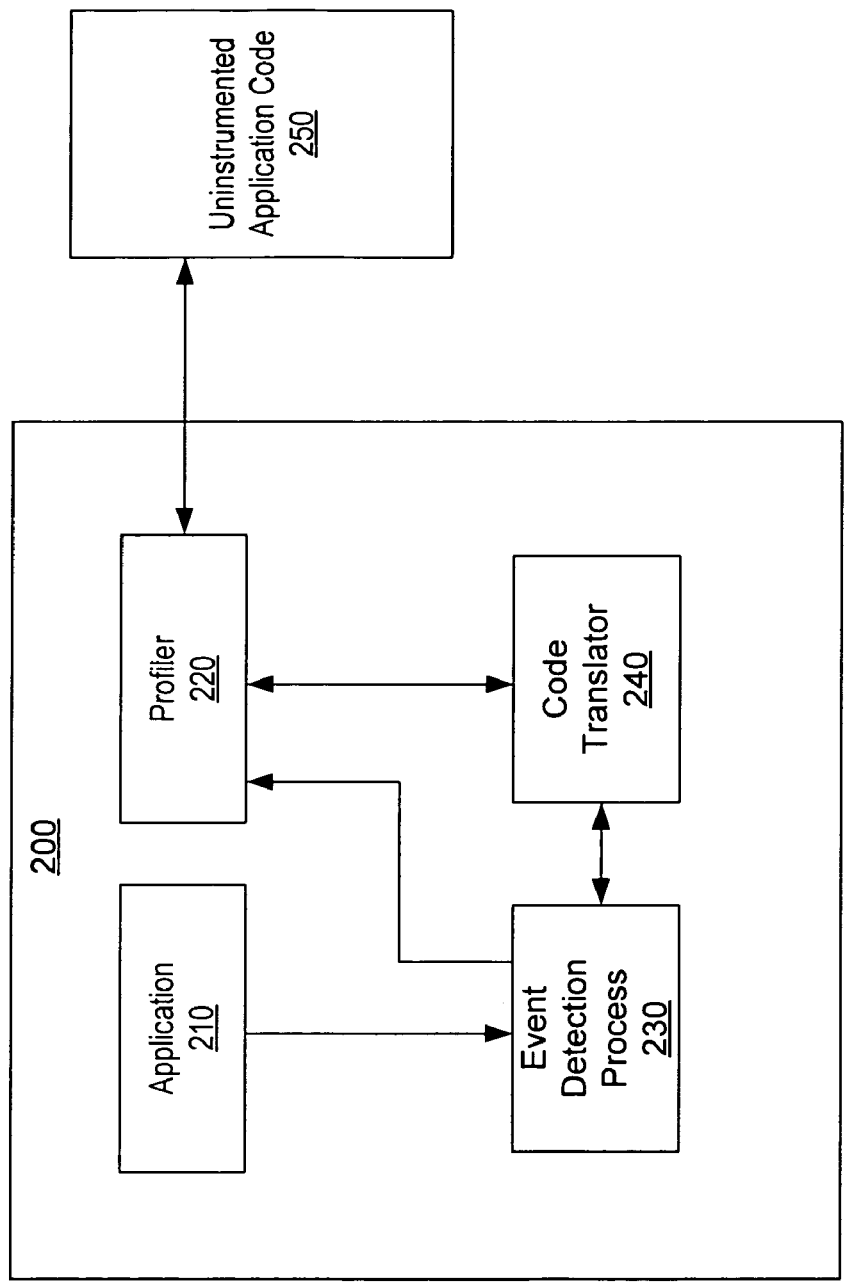
FIG. 2 illustrates one embodiment of computing system configured to support instrumentation of program code.

Turning now to FIG. 2, one embodiment of various components of a computing system are depicted. In the illustrated embodiment, software processes 200 are shown to include an application process 210, event detection process 230, code translator 240, and profiler 220. Also shown is uninstrumented application code 250 which may be stored on a storage device or medium. The storage device/medium may generally comprise non-volatile storage such as a hard disk(s). However, those skilled in the art will appreciate that numerous types of storage devices and technologies—volatile or non-volatile—may be utilized to store data. Further, as used herein, "application code" may refer to any instructions executable by a processing device, and is not limited to end user type application code.

Generally speaking, FIG. 2 provides a high level view of a system which is configured to support the instrumentation of application code for monitoring, profiling, or any other desired purpose. In one embodiment, a computing system's runtime environment is configured to support dynamic translation of application code at the time of loading or execution. For example, in one embodiment, uninstrumented application code 250 may comprise an application's original uninstrumented code which is stored on a disk. Such code 250 may comprise an intermediate representation, such as a bytecode representation, or some other representation which is generally portable across computing platforms. Some examples of systems configured to use intermediate representations include Microsoft's .NET framework and some versions of Sun Microsystems' Java language. Other embodiments may utilize computing platform specific representations, whether intermediate or not.

In an embodiment wherein the application code 250 is an intermediate representation, compilation of the application code 250 from the intermediate representation to a native code or language which is specific to a given platform may be performed at the time the application code 250 is loaded for execution. Generally speaking, when the application code 250 is loaded for execution, a code translator or compiler 240 may be invoked to translate the application code 250 to the native language. Code translator 240 may, for example, comprise a just-in-time (JIT) compiler or similar component. The translated or compiled application code 210 may then be executed. In some embodiments, when an application 250 is loaded for execution, all code of the application 250 may be translated, compiled, or otherwise made ready for execution. However, in other embodiments, certain portions of the application code 250 may not be translated or compiled until needed. For example, in one embodiment, particular functions or methods of an application may not be translated until such functions or methods are encountered (e.g., "called" or "invoked") during execution of the corresponding application code 210. In such an embodiment, when the application code 250 is initially loaded, only the calls to such functions or methods themselves are translated. When the function or method is required during execution, the corresponding code 250 is located, translated by the translator 240, and executed.

In one embodiment, profiler 220 is configured to instrument application code by inserting additional code, or otherwise modifying existing code of an application. Such a profiler 220 may be configured to instrument the application code 250 on disk prior to the application being loaded. Alternatively, or in addition to the above, profiler 220 may be configured to instrument application code dynamically at the time the code 250 is loaded for execution.

In one embodiment, profiler 220 may be configured to register with the underlying software subsystem to receive notification of various events. When such an event is detected by an event detection process 230, the profiler 220 is notified of the event's occurrence. Upon notification of a particular event, the profiler 220 may then take some action. In one embodiment, the profiler 220 registers to be notified when code translator 240 is preparing to translate or compile application code. Notification of the compilation event may also include some identification of the application code (e.g., function or method) which is to be compiled. In response to the notification, profiler 220 may be configured to retrieve the identified application code 250 and instrument or modify the intermediate code prior to the code being translated by code translator 240. After instrumenting the code, the profiler 220 is configured to direct the translator 240 to the instrumented version of the code. The translator 240 may then translate or compile the instrumented version of the code which may then be executed.

In the embodiment of FIG. 2, the original application code 250 may generally remain on disk in an unmodified form. However, in various embodiments, instrumented versions of the code may also be created and stored on disk or other non-volatile media. Accordingly, application code may be instrumented in a dynamic manner, while also having stored versions of the instrumented code. Having the stored instrumented versions available may facilitate debug or other diagnostic efforts when problems arise with the computing system.

Figure 3:
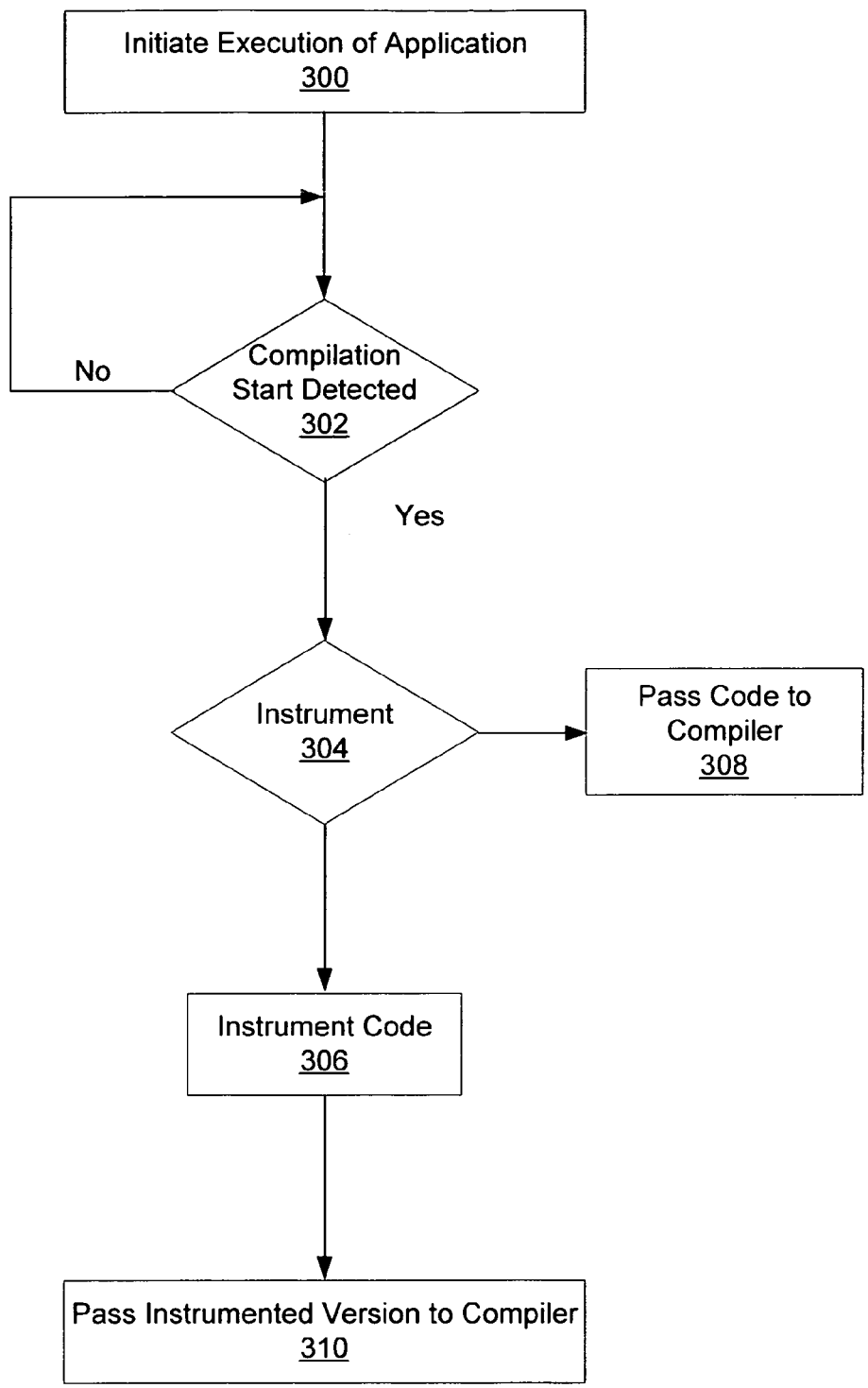
FIG. 3 illustrates one embodiment of a method for instrumenting program code.

FIG. 3 provides a flowchart illustrating one embodiment of a general process for instrumenting code. First, execution of an application is initiated (block 300). Such initiation may, for example, generally correspond to the initial loading of an application from a storage device. Assuming at least some portion of the application code requires translation or compilation, a compilation start event (decision block 302) may be detected by an instrumentation or profiling process. As described above, a profiler may take advantage of an existing "hook" within the software system which allows the profiler to receive notification of various events. For example, the profiler may have previously registered to receive notification of such events via a callback or other service. In other embodiments, an instrumentation process may detect such events via alternative mechanisms such as through a polling process.

Upon detection of the compilation start event (decision block 302), a determination may be made as to whether the particular code is to be instrumented (decision block 304). Numerous alternative approaches may be utilized for making this determination. For example, a developer or user may create a configuration file which identifies selected portions of code for instrumentation. The profiler may then access the configuration file data (at the time of execution or during execution) to determine whether particular code is to be instrumented. If the detected compilation event (decision block 302) corresponds to code which is not identified as code which is to be instrumented, then the code may simply be passed to the compiler (block 308). It is noted that this code may or may not already include instrumentation. If the detected compilation event (decision block 302) corresponds to code which is identified as code to be instrumented, then the profiler, or other process, may then obtain the code which is to be compiled and instrument the obtained code (block 306). Subsequent to instrumenting the code, the profiler may then provide the instrumented version to the compiler (block 310). It is noted that in an embodiment wherein previously instrumented versions of code may also be stored, the profiler may check for such a version before instrumenting the application code. Should an instrumented version already exist, the profiler may forego "re-instrumenting" the application code and simply pass the previously instrumented version to the compiler. All such alternatives and combinations of the above are contemplated.

As discussed above, instrumentation and profiling mechanisms may sometimes generate either too much, or too little, data. Further, identifying code to be instrumented in a manner which provides the right balance and mix of data for useful analysis can be very difficult. Accordingly, in one embodiment, an instrumentation and profiling mechanism is provided which may respond in a dynamic manner to the execution of application code. Often times, evaluation of application code performance and behavior involves an iterative approach wherein processing layers are successively peeled away in order to identify code which contributes to a given behavior. For example, an initial evaluation may reveal that excessive latencies are being experienced with a particular service (e.g., servicing http requests). However, in order to determine why such latencies are occurring, it may be necessary to begin examining particular methods/functions which are utilized by the given service. Analysis of these methods/functions may reveal a particular method/function is experiencing significant latencies. Accordingly, a more detailed analysis of this particular method/function may be undertaken, and so on. As can be seen, analysis may involve peeling away higher levels/layers (i.e., "drilling down") of the code to determine a root cause(s) of a given behavior. While excessive latency is used as an example of a behavior, any condition or behavior may serve as a basis for further analysis.

Figure 4:
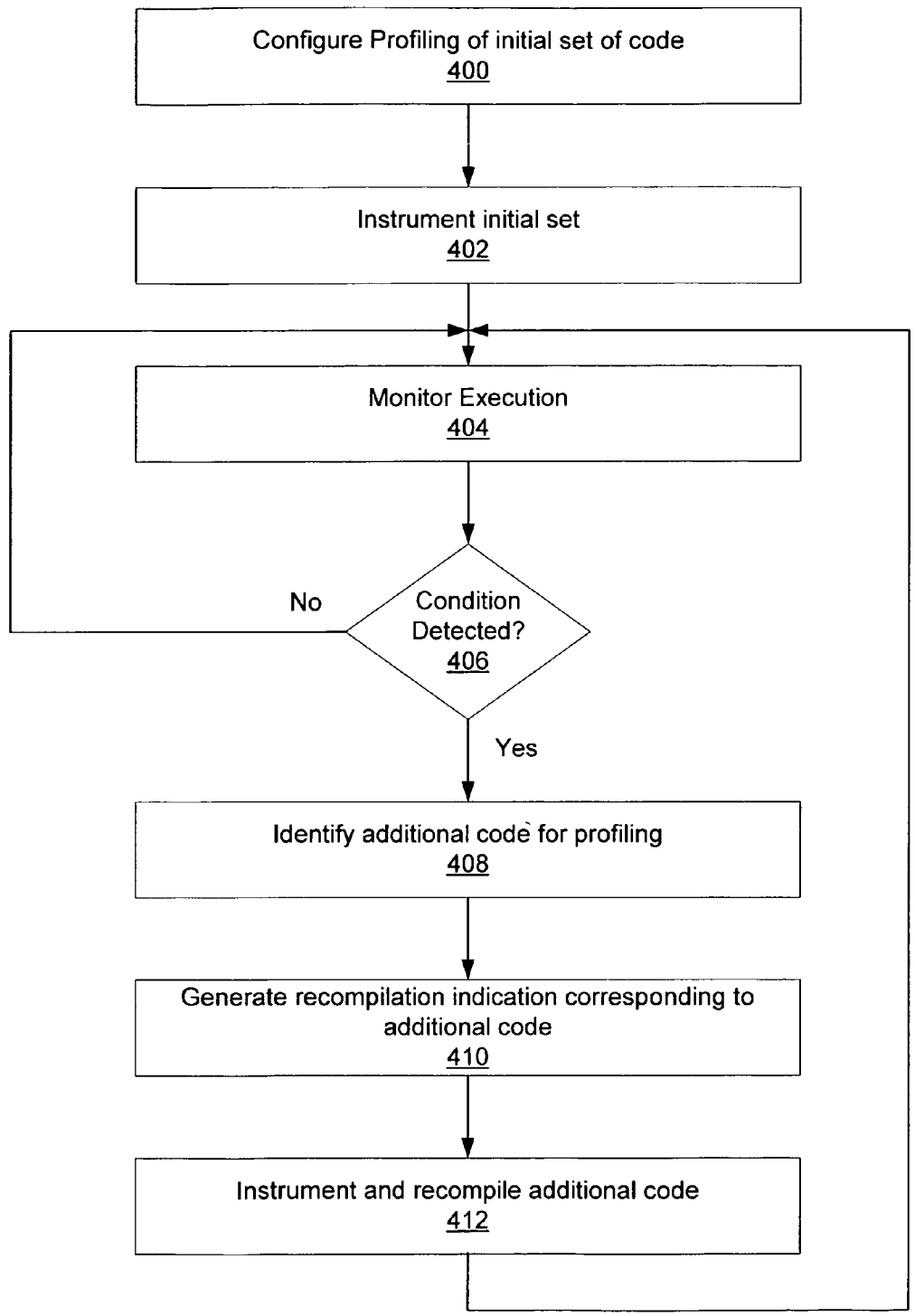
FIG. 4 illustrates one embodiment of a method for dynamically identifying code for recompilation and instrumentation.

Turning now to FIG. 4, one embodiment of a method is shown which enables dynamic instrumentation of code. In the example shown, a profiler may be configured to profile selected code and/or processes (block 400). In one embodiment, the code initially selected for profiling may correspond to fairly high level services (e.g., root methods of a web server). This initially identified set of code may then be instrumented to provide profiling data (block 402). In one embodiment, the initially identified set of code may be instrumented at the time of compilation as described above. However, in other embodiment, the initial set of code may be instrumented statically prior to application execution. All such alternatives are contemplated.

Subsequently, the application code execution is monitored (block 404). During execution, particular behaviors of the code may be monitored. For example, servicing http requests may be monitored for latencies. Should the latency meet and/or exceed some threshold, or meet any other suitable condition, the profiling mechanism may then identify additional code for profiling (block 408). For example, a root method for servicing http requests may have been initially instrumented. During execution, the profiler may determine that this root method is experiencing a condition such as long latencies. Responsive to detecting this condition, the profiler may then examine the root method to identify (block 408) other methods which are called by the root method. The profiler may then generate an indication which indicates these other methods are to be recompiled (block 410). Further, the profiler may store an indication that these other methods are to be instrumented. In response to the recompile indication, the underlying code translator (e.g., JIT compiler) may recompile these other methods. Recompilation of one of these other methods may occur the next time a call to the other method is made, or the recompilation may be scheduled for any other suitable time.

Similar to that discussed in relation to FIG. 3 above, the profiler may be notified of the compilation start event for one of these other methods. In response, the profiler may instrument the corresponding code and pass the instrumented version to the compiler (block 412). Subsequently, monitoring (block 404) may continue. As one or more other methods/code have been instrumented, new profiling data may be available for behavior analysis and may form the basis for additional modifications to instrumentation.

It is noted that one or more of these other methods identified in block 408 may not have been previously compiled. For example, no call to a given "other" method may not have been made during execution. In such a case, a recompilation indication for the given method may not have any effect. Rather, compilation of the given method may occur as usual according to the corresponding system. Whether or not the given method is instrumented may be configurable within the profiler. For example, in certain embodiments it may be assumed that identified "other" methods of a given service which have not be called have not contributed to a particular behavior or condition. Accordingly, the profiler may not select such a method for instrumentation. Alternatively, the profiler may be configured to instrument such a method. All such alternatives are contemplated.

It is noted that the above monitoring and recompilation method and mechanism may be configured to operate without user interaction. For example, responsive to determining a particular service is latency deemed high (with respect to a predetermined threshold, or relative to other processes), the instrumentation and recompilation may be performed automatically. Alternatively, or in addition to an automatic approach, the profiler may be responsive to user interaction during execution of the application as well. For example, a user interface for viewing and analyzing profiling data may be provided. By viewing the data, a user may manually select a particular portion of code (service or method) for instrumentation. An indication corresponding to the selected portion may then be conveyed to the profiler. The profiler may then treat this indication as though it had been generated by the profiler itself (e.g., as described in FIG. 4). In a similar manner, the user interface may enable a user to remove previously provided instrumentation. For example, the user may indicate a method is to be recompiled without instrumentation. Numerous such alternatives are possible and are contemplated.

Figure 5:
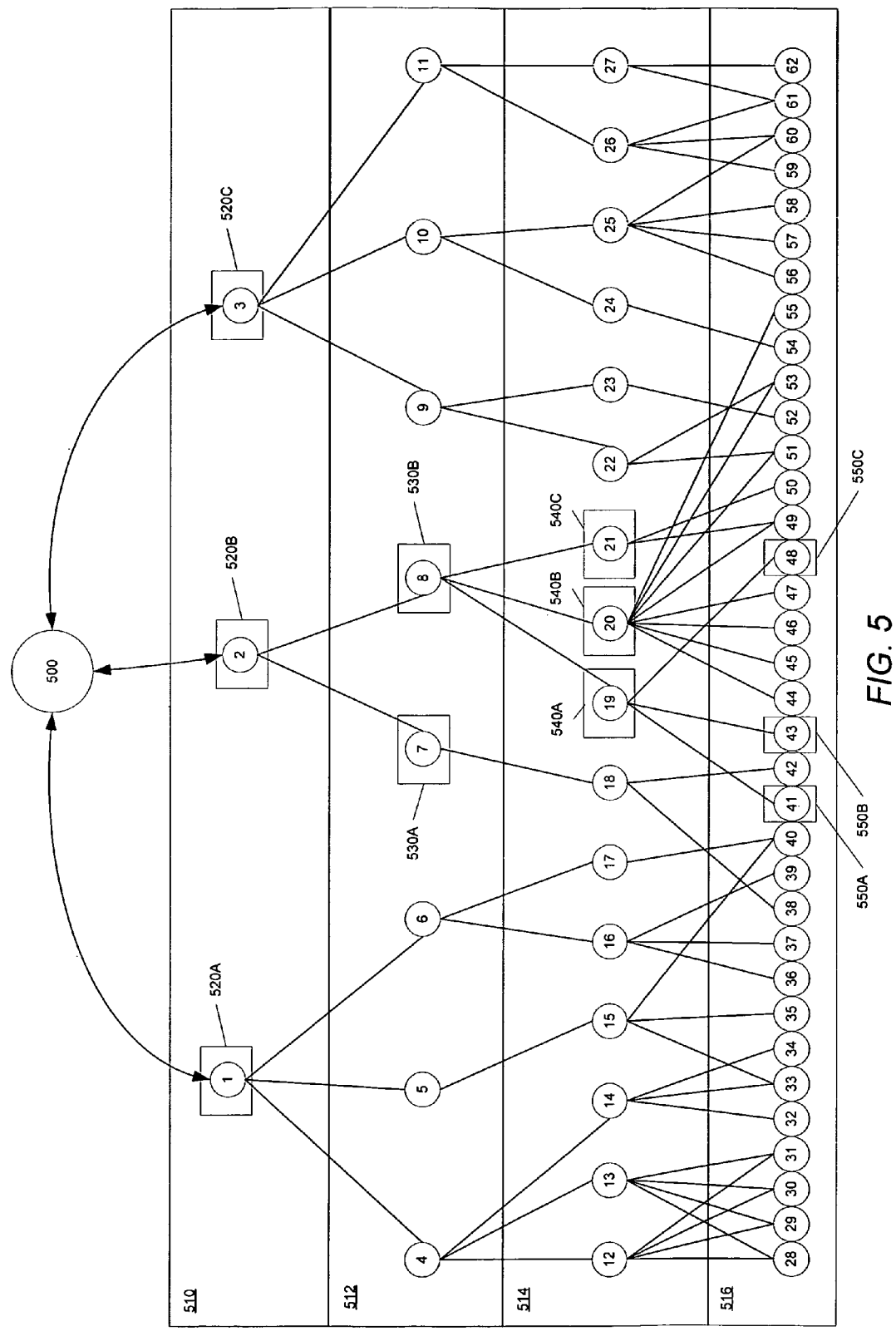
FIG. 5 illustrates one embodiment of the progressive instrumentation of application code.

FIG. 5 provides a visual illustration of a "drilling down" which may be accomplished with the above described methods and mechanisms. Generally speaking, FIG. 5 shows a profiling mechanism 500, and numerous other processes, services, methods, etc. For purposes of discussion, the processes, services, method, etc., will be referred to as "services". The services in FIG. 5 are depicted in a hierarchical manner for ease of illustration. For example, a collection of root services 1-3 are shown to correspond to a higher level 510 within the hierarchy. Services 4-11 which are called by the root services 1-3 are shown within a next lower level 512 within the hierarchy, services 12-27 correspond to level 514, and services 28-62 correspond to level 516. It is to be understood that the illustration provided in FIG. 5 is for illustrative purposes only. Those skilled in the art will appreciate that countless alternative configurations are possible. In particular, the services within a given level may call services in a higher level, and so on. All such alternatives are contemplated.

Following the general approach described in FIG. 3 and FIG. 4, only an initial set of services 1-3 may be instrumented for profiling. Services which are instrumented are depicted with a rectangle. For example, instrumentation of these services 1-3 is denoted by rectangles 520A-520C, respectively. During execution, it may be determined that service 2 is experiencing a particular behavior of interest. In response, services which are utilized by service 2 may be identified. In this example, service 2 utilizes services 7 and 8. Accordingly, services 7 and 8 may be identified for instrumentation and recompilation (520A-520B). Further monitoring may reveal that service 8 is experiencing a behavior of interest. Services 19-21 are identified as being utilized by service 8, and are identified for instrumentation and recompilation (540A-540C). Finally, service 19 may be identified as exhibiting an interesting behavior. Therefore, services 41, 43, and 48 may be identified for instrumentation and recompilation (550A-550C). In this manner, the method and mechanism "drills down" into the code, and provides additional profiling data in a dynamic manner.

Figure 6:
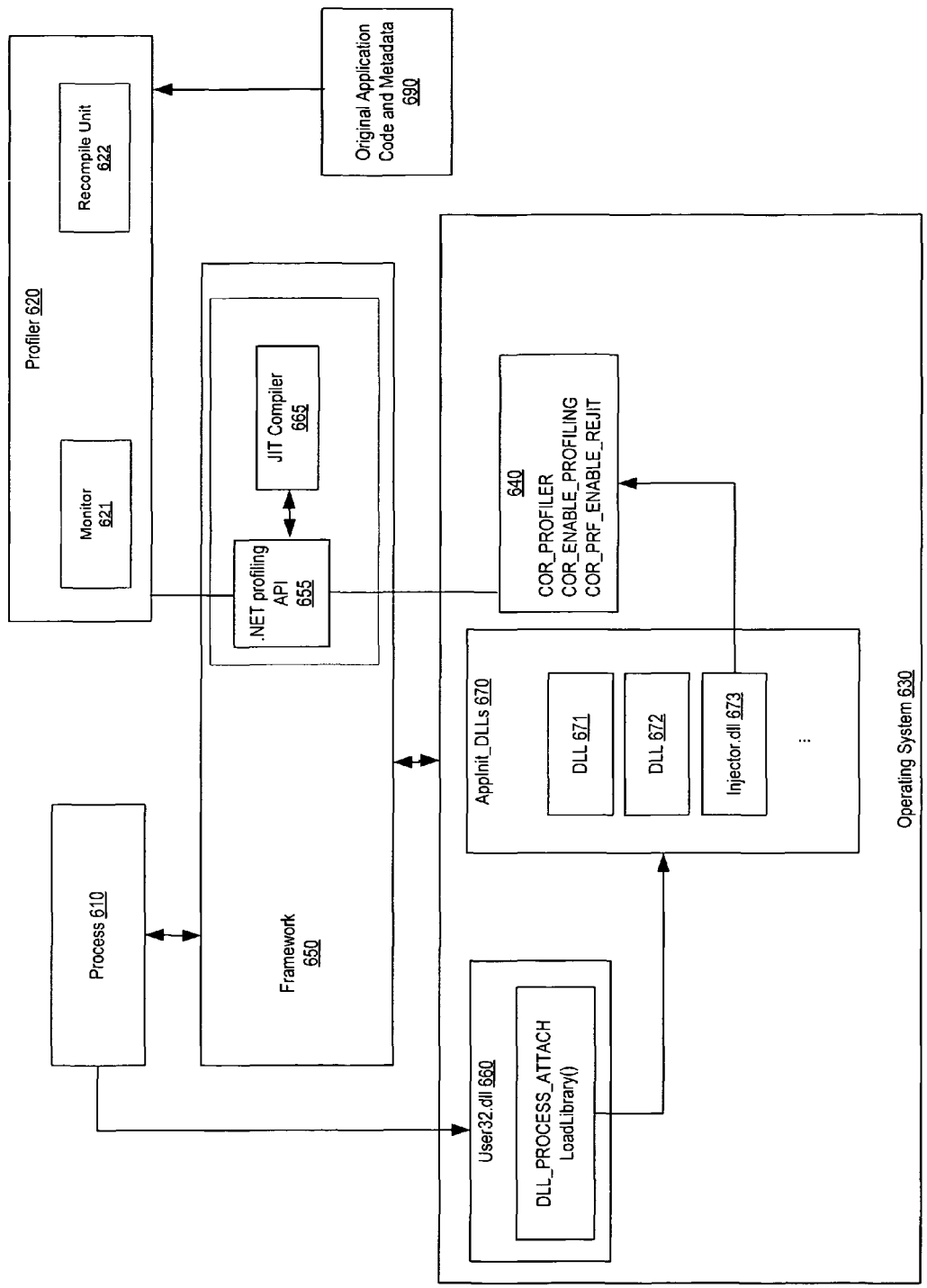
FIG. 6 illustrates one embodiment of a system configured to support dynamic application code instrumentation.

Turning now to FIG. 6, one embodiment of a software system is illustrated which includes components based on a Microsoft Windows operating system and Microsoft .NET framework. While a Microsoft Windows operating system and .NET framework are utilized for purposes of discussion, the methods and mechanisms described herein may be applied in other environments as well. In the illustrated embodiment, a process 610 and a profiler 620 are shown coupled to a .NET framework 650 which may be supported by a Microsoft Windows operating system (Windows) 630. Profiler 620 is shown to include a monitor 621 and recompile unit 622. Process 610 may be, for example, an active server page (ASP) conforming to the ASP.NET specification. Operating system 630 may be one of Windows 98, Windows 2000, Windows XP, or any other version of the Windows operating system with which .NET framework 650 is compatible. In one embodiment, .NET framework 650 includes a .NET profiling application programming interface (API) 655. Profiler 620 may be an application written to use the functionality provided by the .NET profiling API 655 and configured to instrument application code.

In addition to the above, FIG. 6 illustrates original application code and metadata 690. In one embodiment, original code 690 may be stored on non-volatile storage such as a disk, but other storage mechanisms are possible and are contemplated. Also illustrated is a compiler or translator 665. Compiler 665 may comprise a just in time (JIT) compiler configured to compile from a portable intermediate code to a native code of a device on which the code is to be executed. As further illustrated in FIG. 6, operating system 630 may include environment variables (envars) 640, a User32.dll 660, and a list of AppInit_DLLs 670. Envars 640 may comprise environment variables used by operating system 630 to establish an operating environment for each process that is launched. User32.dll is a dynamic link library that may be linked to user defined processes at the time of launch, such as process 610, that utilize the Windows user interface functionality.

In one embodiment, during the launch of process 610, Windows 630 may load various files or libraries into process 610 using a procedure referred to as dynamic linking. Specifically, in one embodiment, Windows 630 may load User32.dll 660 into process 610. As part of the loading procedure for a windows process, operating system 630 may execute a function in User32.dll known as DLLMain with an argument of DLL_PROCESS_ATTACH. This function may execute a "LoadLibrary( )" function to load and initialize DLLs that are listed in AppInit_DLLS 670. AppInit_DLLS 670 may include user specified DLLs 671, 672, 673, etc., that .may be dynamically linked to a process during initialization. In the illustrated embodiment, one of the AppInit_DLLs is an injector.dll 673. Injector.dll 673 may be configured to read a set of values for environment variables 640 from a configuration file and set the environment variables 640 for process 610 according to these values.

Three environment variables in particular may be used for profiling of process(es) 610. The first, COR_ENABLE_PROFILING, enables or disables profiling of process 610. For example, setting COR_ENABLE_PROFILING may enable profiling and, clearing COR_ENABLE_PROFILING may disable profiling. The second, COR_PROFILER, may be used to identify a particular profiler, such as profiler 620 which itself may comprise a one or more DLLs, to be used for instrumenting and profiling code. The third environment variable depicted is COR_PRF_ENABLE_RREJIT which may allow JIT recompilation of methods using calls to ICorProfilerInfo::SetFunctionReJIT.

Library injector.dll 673 may retrieve and set values for environment variables COR_ENABLE_PROFILING, COR_PROFILER, and COR_PRF_ENABLE_RREJIT that apply to process 610 during the launch procedure. In one embodiment, child processes which are spawned by a parent process may inherit the environment, including environment variable settings, of the parent process. Accordingly, in one embodiment, injector.dll may be configured to establish particular environment settings for an application upon initialization of the application. Such settings may then be applied to all processes of the application throughout the life of the application (i.e., until all of the application processes are terminated). In one embodiment, injector.dll 673 may consult a configuration file (not shown) to determine whether a particular application is to be instrumented. In order to avoid the delay of reading from non-volatile storage, a copy of the configuration file may be maintained in memory for faster access. In addition, the configuration file may identify a particular set of services which are to be initially instrumented.

Generally speaking, operation of the system depicted in FIG. 6 may be as follows. During installation or configuration of code corresponding to the profiler 620, the profiler 620 may be configured to register various software components with the underlying framework 650 and/or operating system 630. Such registration may include the registering of particular DLLs, such as profiler 620. In addition, profiler 620 may be configured to register to be notified of particular events as discussed above. In one embodiment, profiler 620 registers to be notified of compilation events corresponding to the JIT compiler 665. In particular, profiler 620 may be notified upon the occurrence of an event which indicates JIT compiler 665 is requesting or otherwise preparing to compile application code 690.

Upon detection of such an event, profiler 620 may determine (e.g., via a configuration file) whether the code which is to be compiled is to be instrumented. If the event corresponds to the initial loading of an application 690, profiler 620 may make such a determination based on an initial set of services identified in a configuration file. Alternatively, if the event does not correspond to the initial loading of an application (e.g., a method is being invoked), profiler 620 may determine whether the method has been identified for instrumentation as discussed above.

In the event of an initial loading of an application, uninstrumented application code 690 is retrieved for compilation. In one embodiment, application code 690 may comprise one or more assemblies suitable for use within a .NET framework 650. Generally speaking, an assembly may comprise a distributable library of related classes and a definition of their scope. Included with an assembly may also be a manifest which contains metadata describing the exported classes in the assembly, external dependencies required by the classes, various permissions for using the assembly, versioning information, and so on. In addition to the above, in one embodiment, application code 690 comprises an intermediate code (such as byte code) which has already gone through a compilation process from an original source language.

In one embodiment, JIT compilation occurs at the assembly level whenever an assembly is first loaded. Methods or functions encountered during compilation of the assembly are not themselves compiled. Rather, an identifier (e.g., a stub) may be inserted for each such function or method. Only when a particular method is invoked, is the body of the method compiled from the intermediate code to the native language of the machine. Upon initiation of code compilation, JIT compiler 665 (or the underlying runtime) notifies the profiler 620. In one embodiment, compiler 665 may notify the profiler via the IcorProfilerCallback::JITCompilationStarted method of the .NET framework 650. Included in the notification to the profiler 620 is an identifier which may be utilized to identify the particular code to be compiled. In response, profiler 620 intercepts the compilation process and invokes the instrumenter (which may be part of the profiler, or maintained as separate code) to instrument a body of code which may comprise a superset of the code which is to be compiled using intermediate language instructions. In various embodiments, profiler 620 may be configured to only instrument selected methods of functions of a given assembly. In such a case, profiler 620 may not instrument application code 690 upon initial loading. However, even in such a case, profiler 690 may still generate and store metadata corresponding to the application. Such metadata may include the identification of various methods and functions of an application, but may also indicate such methods and/or functions have not yet been instrumented.

In response to detecting a JITCompilationStarted event corresponding to a method or function, profiler 620 may utilize a received identifier to identify the method or function to be compiled. The profiler 620 may then determine whether the corresponding method or function has been instrumented (e.g., by accessing corresponding metadata). If the method has not be instrumented, the profiler 620 may then access code containing the body of the method to be compiled. For example, by accessing the assembly containing that code. Once instrumented code has been acquired by the profiler 620, various approaches may be used to modify the method body, including using the SetILFunctionBody method provided by the .NET framework 650. In one embodiment, profiler 620 may use the GetILFunctionBody method to obtain the method body. The profiler 620 may then instrument the method body prior to allowing the compilation process to continue.

It is noted that the JIT compiler 665 may not generally have any idea that the code being compiled is an instrumented version rather than an original version. Rather, the JIT compiler 665 simply proceeds with the compilation of the instrumented version of the code. In various embodiments, application code may include metadata which includes offsets to methods and functions included therein. When profiler 620 instruments code, such offsets may generally be changed. Therefore, the instrumented code metadata generated by the profiler 620 may include a mapping of original offsets to new offsets.

During execution, a monitoring component 621 of the profiler 620 may monitor the execution of processes for behavior of interest (e.g., latencies). Should a particular service be identified as one exhibiting a given behavior, profiler 620 may then identify other services utilized by the particular service for recompilation. In one embodiment, one or more calls similar to ICorProfilerInfo::SetFunctionReJIT may be made, with an identification of the corresponding functions, in order to cause the desired recompilation. In addition, the profiler 620 may store an indication that the corresponding functions are to be instrumented. For example, recompile unit 622 may be configured to determine whether or not a given function/method is to be instrumented. Recompile unit 622 may further maintain a list of those which have already been instrumented. Depending upon the particular configuration, those which have already been instrumented may or may not be removed from the recompile/instrument list. Responsive to the recompilation indication, the profiler 620 may receive a compilation started indication. The profiler 620 then determines whether the particular method is to be instrumented. If instrumentation is indicated, the profiler instruments the code and the instrumented version is passed to compiler as described above. Monitoring may then continue, with further recompilations as necessary.

Figure 7:
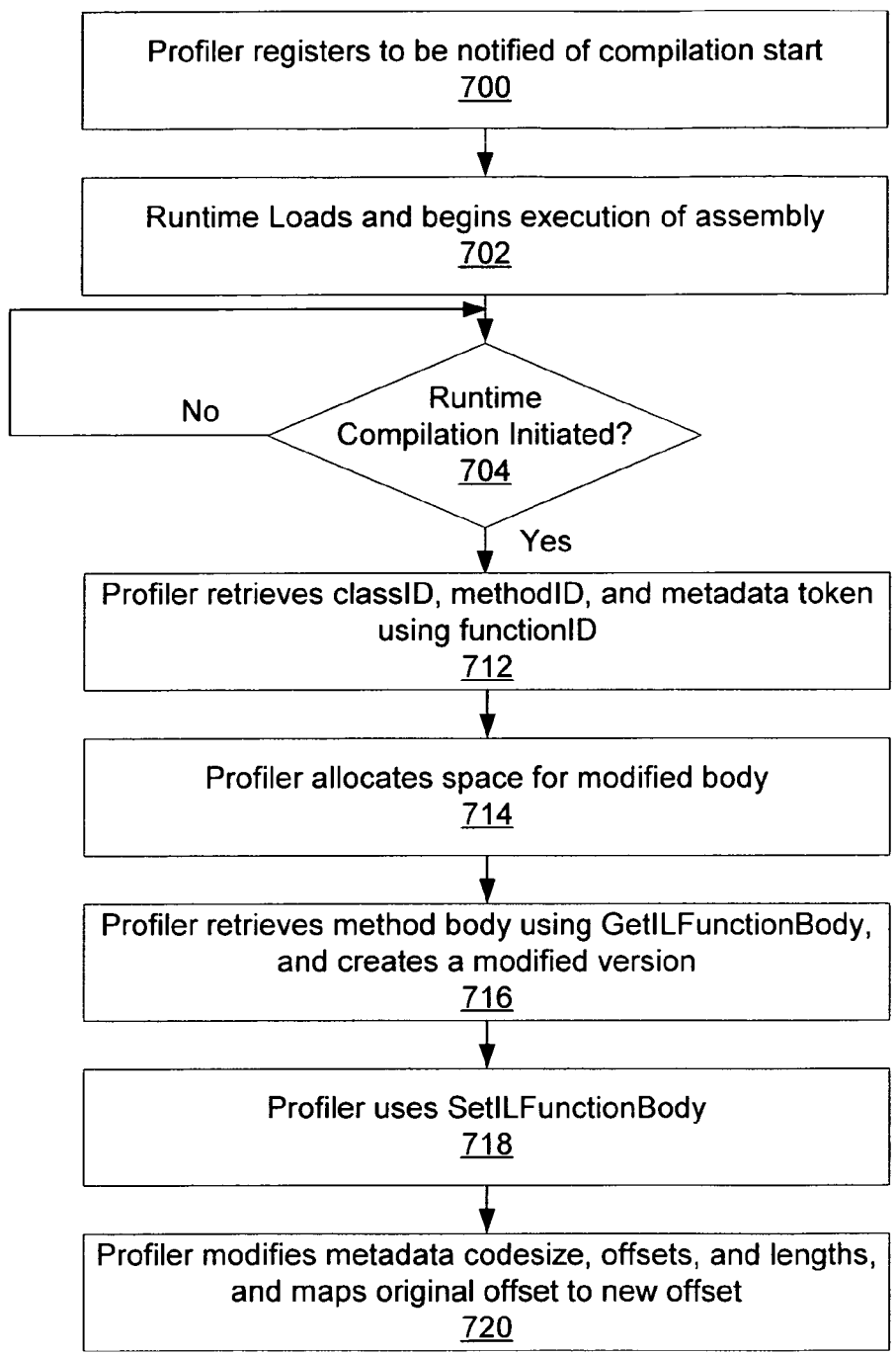
FIG. 7 illustrates one embodiment of a process for managing the instrumentation of program code.

FIG. 7 depicts one embodiment of a method for instrumenting application code. Initially, a profiler registers with the underlying system to be notified of compilation start events (block 700). It is noted that while a specific compilation start event is generally discussed herein, other events may serve as a "hook" for intercepting a compilation process. At some later point in time, the runtime (e.g., common language runtime) loads and begins execution of an application or assembly (block 702). When the runtime initiates compilation of a method, the runtime notifies the profiler of the impending compilation (block 704). In addition, the runtime provides some identification to the profiler of the method to be compiled. In one embodiment, the profiler may use the identification (e.g., functionID) of the method provided by the notification to obtain further information regarding the method. For example, in one embodiment, the profiler may retrieve a class ID, method ID, metadata token, and any other information deemed suitable or necessary (block 712).

In one embodiment, the profiler may first allocate new space for the method body which is to be modified (block 714). However, other embodiments may be configured to work directly on the method body itself rather than a copy. The profiler may then retrieve the method body (e.g., using GetILFunctionBody) and instrument the retrieved code (block 716). The profiler may further set a pointer (e.g., via SetILFunctionBody) to the method body to point to the newly modified version (block 718). Setting a pointer in this manner may have the effect of directing the compiler to the instrumented code for compilation. In addition, the profiler may modify corresponding metadata to identify the location of the instrumented version (block 720). It is to be understood that the activities depicted in FIG. 7 may occur in an order other than that depicted, and one or more may occur concurrently. In addition, other embodiments may utilize more or fewer activities as appropriate.

In one embodiment, a separate configuration file may be utilized by the profiler which indicates how and when instrumentation may be performed. For example, static instrumentation could be performed for specified DLL's, while dynamic instrumentation could be reserved for only those DLL's in a global assembly cache (GAC). All such combinations of static and dynamic instrumentation, and use of configuration files, are contemplated. In addition to the above, a mode is contemplated wherein a profiler or instrumenter may "observe" operation of a specified code. During the observation made, data may be stored which identifies various characteristics of the code being observed. Based upon the gathered characterizing data, decisions may be made as to what portions of code may be instrumented. Such decisions could be made manually (i.e., by a person viewing the gathered data and making corresponding entries in a configuration file) or automatically. For example, in one embodiment, the decision as to whether a portion of code is to be instrumented could be made automatically based upon the nature of the code itself (i.e., certain types of called functions or methods may have a higher priority for purposes of instrumentation), the behavior of code during execution (i.e., some methods are called a relatively large number of time), and so on.

It is noted that the above described embodiments may comprise software. In such an embodiment, the program instructions which implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
 a processor;
 a compiler; and
 a profiler, wherein the profiler is configured to:
  insert one or more instrumentation instructions in an application to form an instrumented application;
  (i) execute the instrumented application;
  (ii) detect a condition during execution of the instrumented application wherein execution of one or more instrumented portions of code in the instrumented application are exhibiting excessive performance latency; and
  (iii) in response to detecting said condition:
   identify the one or more instrumented portions of code within the application that corresponds to the detected condition; and
   dynamically instrument the identified one or more instrumented portions of code during runtime by:
    inserting one or more additional instrumentation instructions in the identified one or more instrumented portions of code; and conveying a request for recompilation of the identified one or more instrumented portions of code with the additional one or more instrumentation instructions;

wherein the profiler is configured to repeat performance of (i), (ii), and (iii) as needed to identify a particular portion of the identified one or more instrumented portions of code which are contributing to the excessive performance latency.

2. The system as recited in claim 1, wherein the compiler is configured to notify the profiler of a compilation event prior to recompiling the code.

3. The system as recited in claim 1, wherein the application comprises an intermediate language, the identified portion of code comprises previously compiled native code, and wherein the compiler comprises a just in time compiler.

4. The system as recited in claim 2, wherein the profiler is configured to register with the processing system to be notified of the compilation event via a callback.

5. The system as recited in claim 2, further comprising a profiling API of a Microsoft .NET framework, and wherein the event comprises a JITCompilationStarted event.

6. The system as recited in claim 1, wherein the profiler is configured to:
   identify a plurality of root services as being root services in a hierarchy of services;
   instrument each of the root services;
   detect a given condition relating to performance of the application, subsequent to instrumenting each of the root services;
   in response to identifying a particular service of the plurality of root services as corresponding to the given condition:
      examine the particular service to identify a selected plurality of services utilized by the particular service;
      instrument each of the selected plurality of services; and
      convey a request for recompilation of the selected plurality of services as instrumented.

7. A method for dynamically instrumenting application code, the method comprising:
   inserting one or more instrumentation instructions in an application to form an instrumented application;
   (i) executing the instrumented application;
   (ii) detecting a condition during execution of the instrumented application wherein execution one or more instrumented portions of code in the instrumented application are exhibiting excessive performance latency; and
   (iii) in response to detecting said condition:
      identifying the one or more instrumented portions of code within the application that that correspond to the detected condition;
      dynamically instrumenting the identified one or more instrumented portions of code during runtime by:
         inserting one or more additional instrumentation instructions in the identified one or more instrumented portions of code; and
         conveying a request for recompilation of the identified one or more instrumented portions of code with the additional one or more instrumentation instructions;
   repeating performance of (i), (ii), and (iii) as needed to identify a particular portion of the instrumented portion of the identified one or more instrumented portions of code which is contributing to the excessive performance latency.

8. The method as recited in claim 7, further comprising notifying the profiler of a compilation event prior to recompiling the code.

9. The method as recited in claim 7, wherein the application comprises an intermediate language, the identified portion of code comprises previously compiled native code, and wherein the compiler comprises a just in time compiler.

10. The method as recited in claim 8, further comprising registering with the processing system to be notified of the event via a callback.

11. The method as recited in claim 8, further comprising a profiling API of a Microsoft .NET framework, and wherein the event comprises a JITCompilationStarted event.

12. The method as recited in claim 7, further comprising:
   identifying a plurality of root services as being root services in a hierarchy of services;
   instrumenting each of the root services;
   detecting a given condition relating to performance of the application, subsequent to instrumenting each of the root services;
   in response to identifying a particular service of the plurality of root services as corresponding to the given condition:
      examining the particular service to identify a selected plurality of services utilized by the particular service;
      instrumenting each of the selected plurality of services; and
      convey a request for recompilation of the selected plurality of services as instrumented.

13. A computer readable storage medium comprising program instructions, wherein when executed the program instructions are operable to:
   insert one or more instrumentation instructions in an application to form an instrumented application;
   (i) execute the instrumented application;
   (ii) detect a condition during execution of the instrumented application wherein execution of one or more instrumented portions of code in the instrumented application are exhibiting excessive performance latency; and
   (iii) in response to detecting said condition:
      identify the one or more instrumented portions of code within the application that corresponds to the detected condition; and
      dynamically instrument the identified one or more instrumented portions of code during runtime by:
         inserting one or more additional instrumentation instructions in the identified one or more instrumented portions of code; and
         conveying a request for recompilation of the identified one or more instrumented portions of code with the additional one or more instrumentation instructions;
   wherein the profiler is configured to repeat performance of (i), (ii), and (iii) as needed to identify a particular portion of the identified one or more instrumented portions of code which are contributing to the excessive performance latency.

14. The computer readable storage medium as recited in claim 13, wherein the program instructions are further operable to receive notification of a compilation event prior to recompilation of the code.

15. The computer readable storage medium as recited in claim 13, wherein the application comprises an intermediate language, the identified portion of code comprises previously compiled native code, and wherein the compiler comprises a just in time compiler.

16. The computer readable storage medium as recited in claim 14, wherein the program instructions are further operable to register to be notified of the compilation event via a callback.

17. The computer readable storage medium as recited in claim 13, wherein the program instructions are further operable to:
identify a plurality of root services as being root services in a hierarchy of services;
instrument each of the root services;
detect a given condition relating to performance of the application, subsequent to instrumenting each of the root services;
in response to identifying a particular service of the plurality of root services as corresponding to the given condition:
examine the particular service to identify a selected plurality of services utilized by the particular service;
instrument each of the selected plurality of services; and
convey a request for recompilation of the selected plurality of services as instrumented.

18. The computer readable storage medium as recited in claim 13, wherein the condition comprises a performance latency.

19. The system as recited in claim 6, wherein the plurality of services utilized by the particular service are only those services directly called by the particular service.

20. The system as recited in claim 1, wherein the profiler is configured to:
identify a plurality of root services as being root services in a hierarchy of services;
instrument each of the root services;
monitor execution of the application; and
selectively instrument only those services which are directly called by a service that has been identified as corresponding to a condition relating to performance latency of the application.

* * * * *